United States Patent
McIntyre et al.

(10) Patent No.: US 6,353,458 B1
(45) Date of Patent: Mar. 5, 2002

(54) CAMERA WITH NON-EMISSIVE ELECTRONIC DISPLAY HAVING FIELD-DRIVEN SOLID PHASE PARTICLES

(75) Inventors: Dale F. McIntyre, Honeoye Falls; Steven D. MacLean, Webster; Xin Wen, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/012,890

(22) Filed: Jan. 23, 1998

(51) Int. Cl.[7] .............................................. H04N 5/222
(52) U.S. Cl. ................................. 348/333.01; 348/220
(58) Field of Search ................................. 348/207, 220, 348/222, 231, 232, 233, 239, 333.01–333.13; 438/323, 320.2, 402.2; 345/85; 359/296; H04N 5/222

(56) References Cited

U.S. PATENT DOCUMENTS

| | | |
|---|---|---|
| 4,143,103 A | 3/1979 | Sheridon |
| 4,262,301 A | 4/1981 | Erlichman |
| 5,313,611 A | 5/1994 | Franklin et al. |
| 5,344,594 A | 9/1994 | Sheridon |
| 5,389,945 A * | 2/1995 | Sheridon ..................... 345/85 |
| 5,432,906 A | 7/1995 | Newman et al. |
| 5,469,210 A * | 11/1995 | Noguchi et al. ............ 348/231 |
| 5,604,027 A | 2/1997 | Sheridon |
| 5,627,603 A * | 5/1997 | Sakai ......................... 348/231 |
| 5,673,084 A * | 9/1997 | Linn et al. ................. 348/333.1 |
| 5,815,306 A * | 9/1998 | Sheridon et al. ............ 359/296 |

FOREIGN PATENT DOCUMENTS

WO    WO 97/04398    2/1997

OTHER PUBLICATIONS

"A Newly Developed Electrical Twisting Ball Display", by M. Saitoh, T. Mori, R. Ishikawa and H. Tamura, Proceedings of the SID, vol. 23/4, 1982.

* cited by examiner

*Primary Examiner*—Tuan Ho
(74) *Attorney, Agent, or Firm*—Raymond L. Owens

(57) ABSTRACT

An electronic camera includes optics for focusing an image of a subject at an image plane, an area image sensor disposed at the image plane for receiving the image subject and producing a digital image having a plurality of pixels that represent the subject, and a storage structure coupled to the area image sensor for storing the digitized image of the subject. A non-emissive display for displaying an image corresponding to the stored image, includes field-driven solid phase particles disposed in a matrix that can change reflective density in the display in response to an applied electric field, and an electronic addressing arrangement including electrodes for applying voltages across the field-driven particles at particular locations corresponding to pixels in response to the stored image to produce a displayed image of the subject.

7 Claims, 5 Drawing Sheets

CAMERA WITH NON-EMISSIVE ELECTRONIC DISPLAY HAVING FIELD-DRIVEN SOLID PHASE PARTICLES

CROSS REFERENCE TO RELATED APPLICATIONS

The present invention is related to commonly assigned U.S. patent application Ser. No. 08/934,371 filed Sep. 19, 1997, entitled "A Portable Electronic Recording and Displaying Device" to Wen et al U.S. patent application Ser. No. 08/951,017 filed Oct. 15, 1997, entitled "Camera With Microfluidic Printer" to McIntyre "ADDRESSING NON-EMISSIVE COLOR DISPLAY DEVICE" by Wen/MacLean. The disclosure of this related application is incorporated herein by reference.

FIELD OF THE INVENTION

The present invention relates to a camera which include a display for displaying an image of a subject stored in the camera.

BACKGROUND OF THE INVENTION

It is known in the prior art to provide an electronic camera which uses an area image sensor. Digital images produced from the image sensor are stored in memory and these images can be shown on a liquid crystal display (LCD) so that the user can determine which image should be stored for use in producing hard copy images. Typically, these images can be stored in a magnetic disk or in a solid state Memory Card.

In U.S. Pat. No. 4,262,301 an electronic camera is disclosed which includes a display device. The camera also includes a digital-to-analog converter which sends signals to the display. Also, the digital-to-analog converter selectively sends these images to a magnetic tape for storage. Images on the magnetic tape can then be produced as a hard copy by a printer which is provided on the camera. A problem with the approach in U.S. Pat. No. 4,262,301 is the difficulty in achieving small product size.

A shortcoming with prior electronic cameras is that the display is of the emissive type. This requires the use of power to generate light. In turn this additional power demand requires a larger battery to power the light generating means. The light generating means often requires additional space. This is the case in the use of the liquid crystal display. The display provides switching elements which control the light. A separate light generating means is required to generate the light.

For simplicity, the invention as described does not include a printing device. It is understood that a printing device may be included without altering the present invention. Such a printing device is disclosed the commonly assigned U.S. patent application Ser. No. 08/951,017 filed Oct. 15, 1997, entitled "Camera With Microfluidic Printer" to McIntyre.

Liquid crystal displays (LCD) are, of course, well known in the art and are employed on numerous cameras. Liquid crystal displays use molecules in liquid crystalline phases to change the polarization of light. A user views an image on the display through a pair of cross polarizers which are part of the display. Polarizers can cause a significant amount of light loss degrading a viewed image. In order to overcome this problem, the LCDs use a significant amount of power. Also, it is difficult to get high levels of density variations which can effect the quality of the image on the display.

SUMMARY OF THE INVENTION

It is an object of the present invention to provide an electronic camera having a display which can be made small, requires low power levels, and can produce a high quality image.

This object is achieved by an electronic camera, comprising:

a) means for focusing an image of a subject at an image plane;

b) area image sensor means disposed at the image plane for receiving the image subject and producing a digital image having a plurality of pixels that represent the subject;

c) storage means coupled to the area image sensor for storing the digitized image of the subject; and d) a display for displaying an image corresponding to the stored image, including:
   i) field-driven solid phase particles disposed in a matrix that can change reflective density in the display in response to an applied electric field; and
   ii) electronic addressing means including electrodes for applying voltages across the field-driven particles at particular locations corresponding to pixels in response to the stored image to produce a displayed image of the subject.

ADVANTAGES

This invention is particularly useful in that solid phase field-driven particle, when used in a display, operate in a reflective mode and use available light to illuminate the image. The use of available light imaging improves viewing the displayed image in areas of high ambient light. Also, it is a feature of the invention that it requires low power and does not require complicated optics found in prior displays.

In bright lighting, emissive displays fail to produce sufficient light output, and the ambient light severely washes out the generated light. The present invention produces superior images in high lighting areas.

This invention has the additional advantage in that non-emissive field-driven particle displays consume less power than traditional emissive displays. This reduction in power requirements reduces battery energy requirements. In turn this permits the use of batteries of lower power and smaller size.

This invention has the additional advantage that non-emissive displays have wider viewing angles than LCDs.

This invention has the additional benefit that non-emissive displays do not require a light generating device. This results in a significant reduction of display volume and thickness.

DETAILED DESCRIPTION OF THE INVENTION

Figure 1:
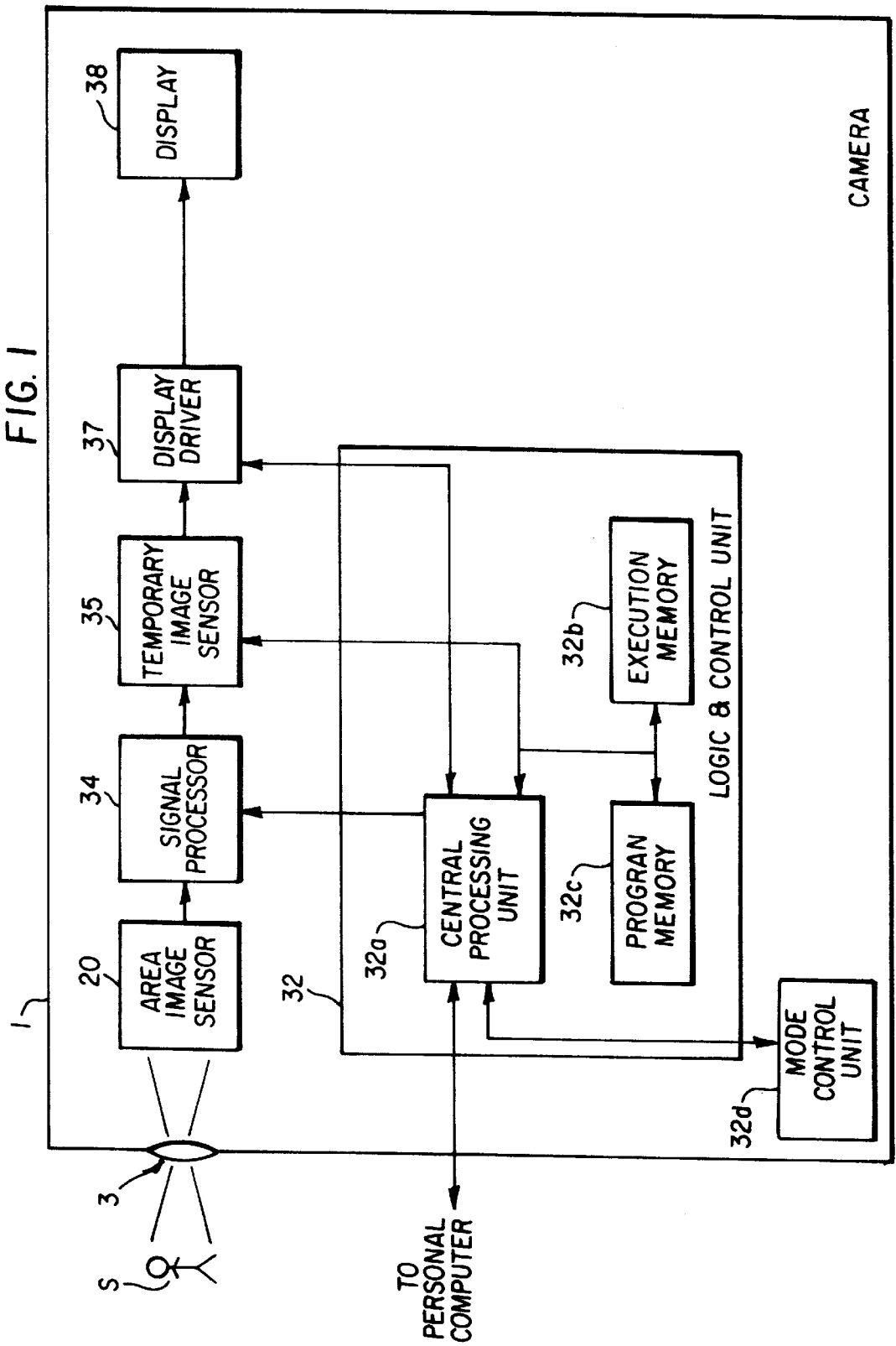
FIG. 1 is a block diagram of an electronic camera having a non-emissive display in accordance with the present invention with the necessary electronics for operating the camera and the display.

A block diagram the electronic camera 1 is shown in FIG. 1. A subject S is positioned in front of the imaging lens 3. The camera 1 includes an area image sensor 20 arranged to coincide with the axis of the imaging lens 3. A non-emissive display 38 is embodied in a panel type structure. An image of the subject is focused on the area image sensor 20. Area image sensor 20 can be a full frame charge coupled device (CCD) or, alternatively, can be an interline device with, for example, photodiode pixels which are adapted to deliver charge to interline CCDs. The area image sensor 20 can also be fabricated by Complimentary Metal-Oxide-Semiconductor (CMOS) technology. Conventional electronic circuitry (not shown) is associated with the image sensor 20. After the image sensor 20 receives light representative of the image of the subject S, the circuitry sets up, acquires, and transfers electronic signals from the area image sensor 20. Such electronics are well known in the art and their description is omitted for clarity of discussion.

Logic and control unit 32 causes the area image sensor 20 to transfer electrical signals to signal processor 34. The signal processor 34 will be understood to include that circuitry necessary for converting the area image sensor signals to electrical signals and includes gain control and analog-to-digital circuitry as well known in the art. The logic and control unit 32 can, of course, include a microprocessor as is well known to those skilled in the art. The signal processor 34 delivers, under the control of logic and control unit 32, signals into a storage location in a temporary image memory 35 which can be either a floppy disk or semiconductor memory under the control of logic and control unit 32. These signals, when stored, represent a digital image of the subject. The logic and control unit 32 causes the digital signals in memory to be applied to a display driver 37 which, in turn, applies signals to a non-emissive display 38. The display driver 37 will be understood to include a digital-to-analog converter and formatting control which is appropriate for the type of display device as well known in the art. The non-emissive display 38 may be embodied as a liquid crystal display. As well understood to those skilled in the art, the logical and control unit 32 provides refresh signals to the non-emissive display 38. It will be understood that the logic and control unit 32 can also deliver the digital image to an external device such as a personal computer.

The logic and control unit 32 is shown to include a central processing unit 32*a* which may be provided by a microprocessor chip. Execution memory 32*b* is also shown and is typically provided by random access memory (RAM). This memory is used for computation during image adjustment of the various parameters. As is well known to those in this art, the program memory 32*c* (typically ROM) can include conventional image processing algorithms for changing image resolution and the color content by so-called color management programs. A mode control unit 32*d*, including a keyboard, a manual switch or a combination of both, permits a user to select the appropriate program by directly inputting interrupt signals into the central processing unit 32*a*.

Many of such image processing algorithms have been implemented as commercially available packages such as: Photoshop (trademark of Adobe Systems Incorporated), Color Studio (trademark of Letraset), and PhotoMac (trademark of Avalon Development Group). For examples of color management systems including color transforms for changing color content such as contrast, brightness, and gamut, see U.S. Pat. Nos. 5,313,611 and 5,432,906, the disclosures of which are incorporated herein by reference.

Figure 2:
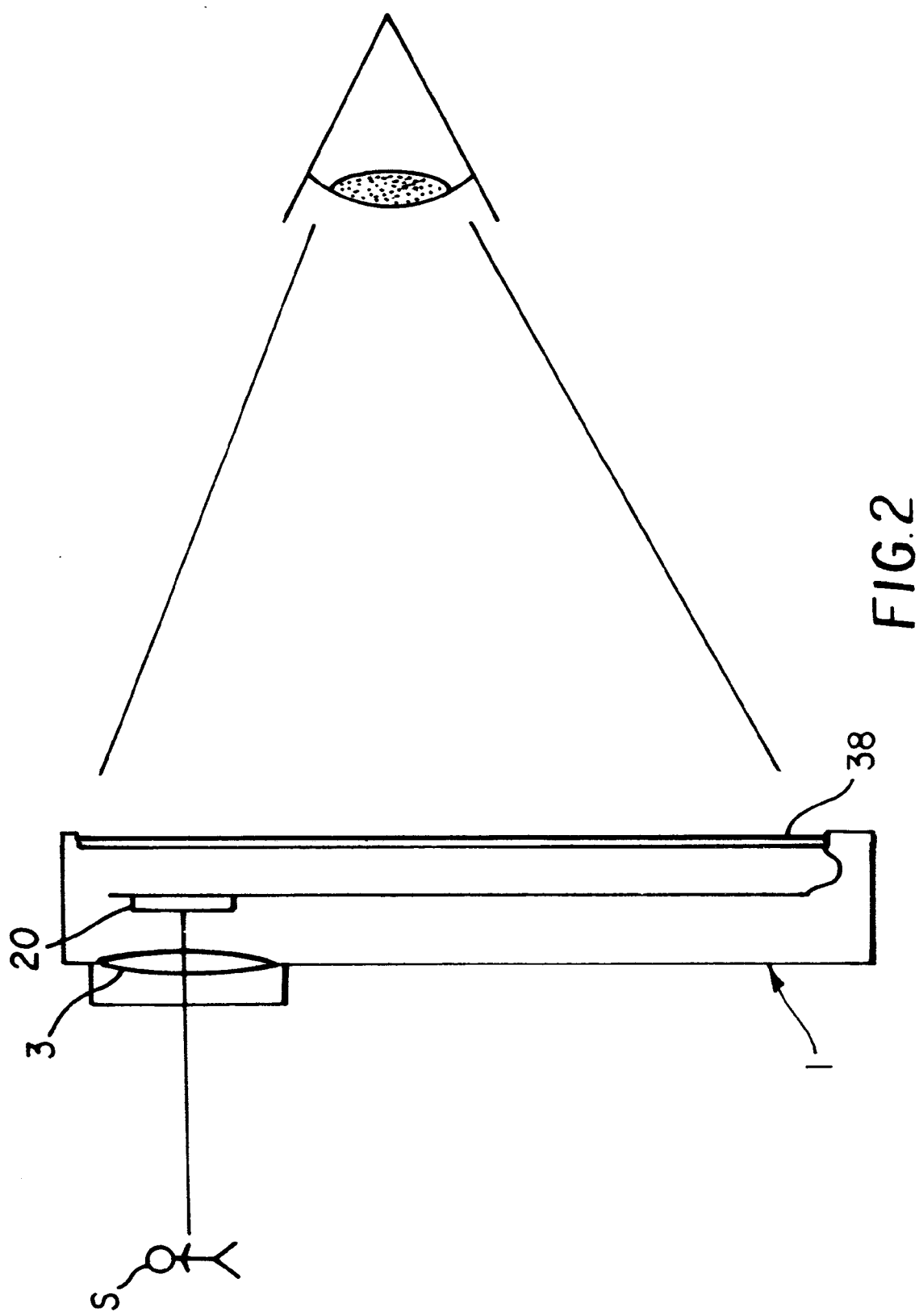
FIG. 2 is a side view showing a user viewing the display on the electronic camera in accordance with the present invention.

A cross-sectional view of the electronic camera 1 is shown in FIG. 2. A subject S is positioned in front of the imaging lens 3. The camera 1 includes an area image sensor 20 arranged to coincide with the axis of the imaging lens 3. A non-emissive display 38 can be viewed, in this particular example, from the opposite side of lens 3 on the camera 1. It is understood that the non-emissive display 38 can also locate at other positions on the camera 1.

Figure 3A:
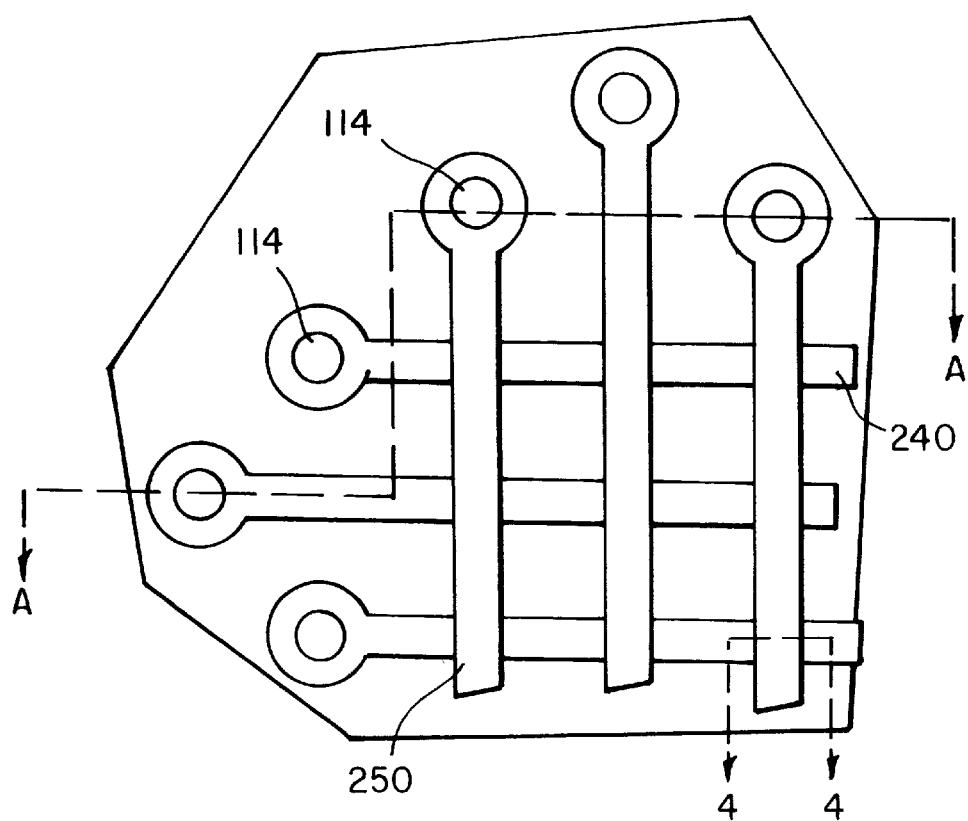
FIG. 3a is a bottom view of a portion of the display in the electronic camera in the present invention.
Figure 3B:
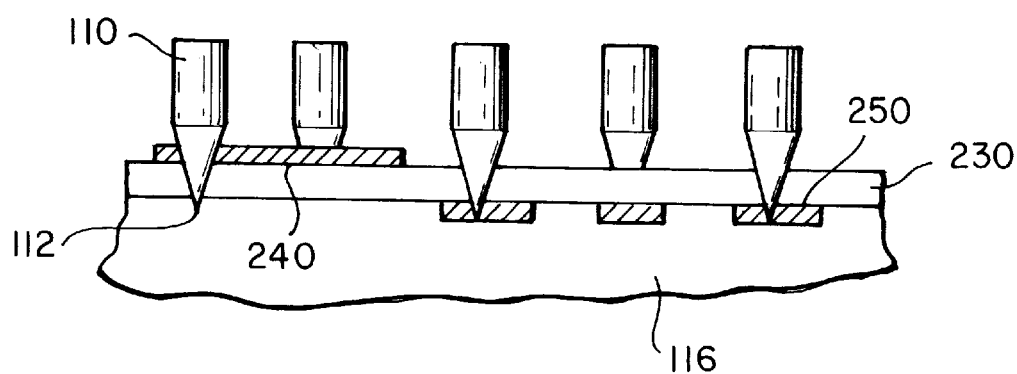
FIG. 3b is a cross-sectional view of the interconnect portion of the display.

Electrical connection is shown in FIG. 3*a* shows a bottom view of a portion of the display. Row electrodes 240 and column electrodes 250 terminate in conductive pads 114. Pin 110 having piercing point 112 is disposed in a rigid non-conductive matrix (not shown). The pin 110 is pressed into display 38 so that piercing points 112 are driven through conductive pads 114 at the termination of row electrode 240 and column electrode 250 into pin matrix 116. The piercing action provides an electrical interconnection to the row electrode 240 and the column electrode 250.

Figure 4A:
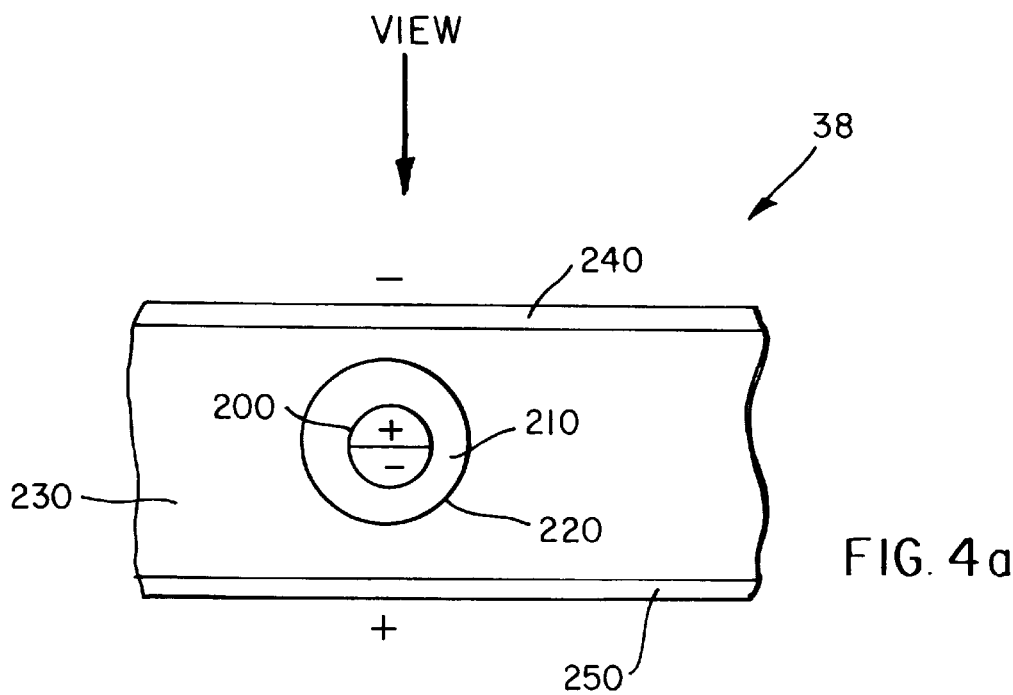
FIG. 4a is a cross-sectional view of the display in the electronic camera in the present invention showing the field driven particles in the white state.
Figure 4B:
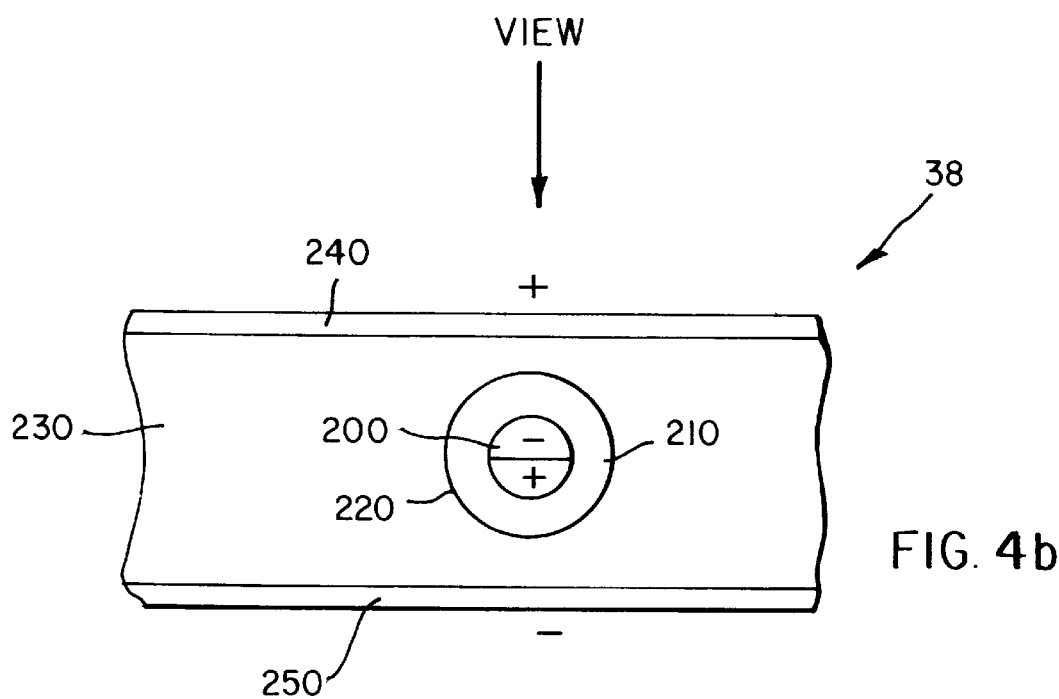
FIG. 4b is a cross-sectional view of the display in the electronic camera in the present invention showing the field driven particles in the black state.

FIG. 4*a* and 4*b* shows a more detailed cross-sectional view of the non-emissive display 38. The non-emissive display 38 is shown to comprise a plurality of field-driven particles 200. In FIG. 1, the field-driven particles 200 are exemplified by bi-chromatic particles, that is, half of the particle is white and the other half is of a different color density such as black, yellow, magenta, cyan, red, green, blue, etc. The bi-chromatic particles are electrically bi-polar. Each of the color surfaces (e.g. white and black) is aligned with one pole of the dipole direction. The field-driven particles 200 are suspended in a fluid 210 such as oil which are together encapsulated in a microcapsule 220. The microcapsules 220 are immersed in matrix 230. Addressing electrodes are arranged in pairs with row electrode 240 above and column electrode 250 below the matrix in a pixelized fashion. One example of the materials for the electrodes is Indium Tin Oxide. Upon the application of a electric potential difference between each pair of addressing electrodes, a displacement electric field induced in the microcapsule 220 align the field-driven particles 200 to a low energy direction in which the ends of the dipole are respectively aligned to the electrodes of the opposite charges. The term "field-driven particle" will be understood to include a particle that is solid phase typically immersed in fluid in a microcapsule. FIG. 4*a* shows the particle 200 in the white state with a negative potential applied to the row electrode 240 and a positive potential applied to the column electrode 250. FIG. 4*b* shows the particle 200 in the black state with a positive potential applied to the row electrode 240 and a negative potential applied to the column electrode 250.

The state of the particle 200 is dependent on the applied field and not on the prior state of the particle 200. The non-emissive display 38 may perform multiple write and erase cycles without effecting performance. The terms write and erase will be understood to be applying a voltage to set the particles to a foreground and background color respectively. A user may chose foreground and background colors. Details of the fabrication of the bi-chromatic dipolar particles and their addressing configuration are disclosed in U.S. Pat. Nos. 4,143,103, 5,344,594, and 5,604,027, and in "A Newly Developed Electrical Twisting Ball Display" by Saitoh et al p249–253, Proceedings of the SID, Vol. 23/4, 1982, the disclosure of these references are incorporated herein by reference. Another type of field-driven particle is disclosed in PCT Patent Application WO 97/04398. It is understood, however, that the present invention is compatible with many other types of field-driven particles that can display different color densities under the influence of an electrically activated field.

Figure 5:
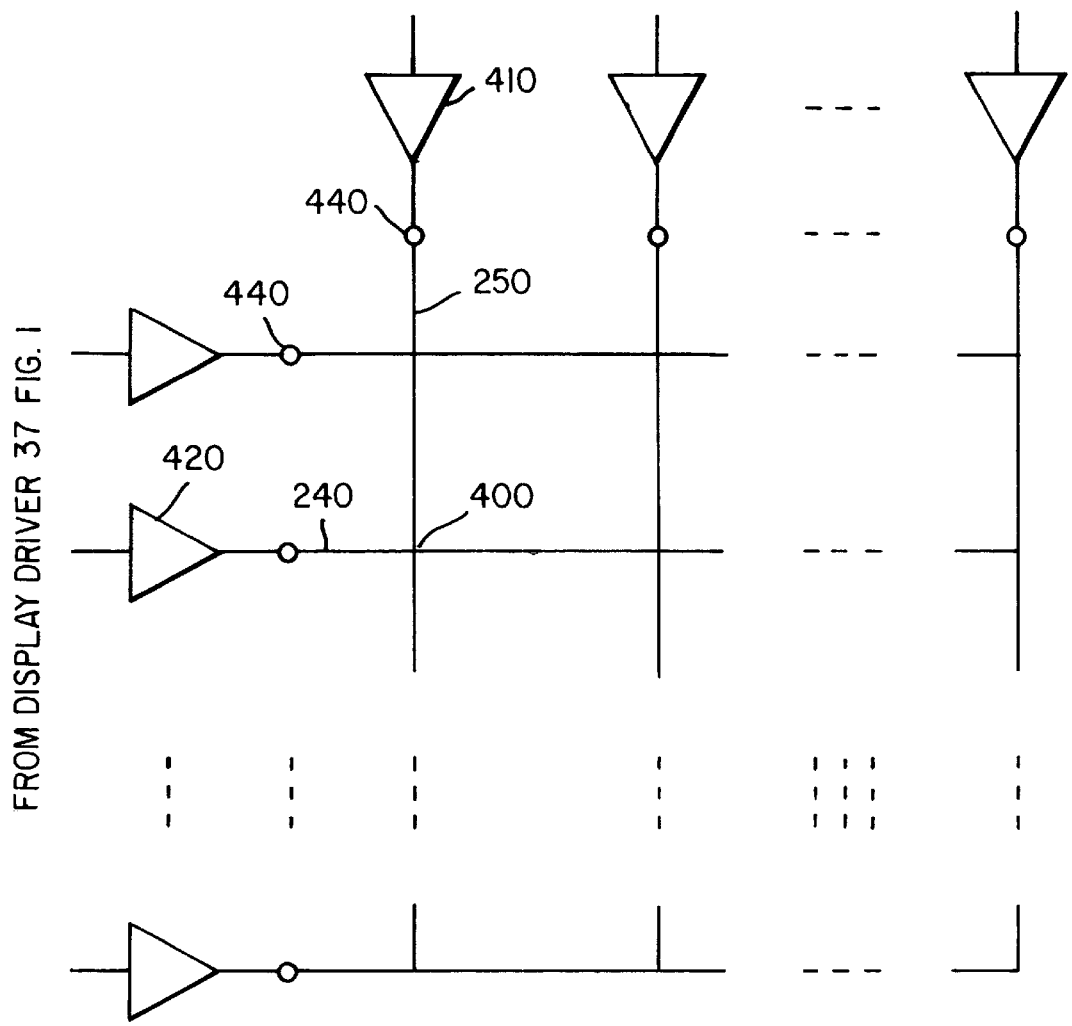
FIG. 5 is a schematic of the driver electronic circuit in the display.

A detailed electronic diagram of the display driver 37 of FIG. 1 is shown in FIG. 5. The display driver 37 includes row electrodes 240 and column electrodes 250 which are embodied by conductive stripes which are shown for convenience as lines. Furthermore, some of the electrodes will be transparent to permit the user to see through from the viewing side of the non-emissive display 38. The row electrode 240 is driven by row driver 420 through interconnect 440. The column electrode 250 is driven by column driver 410 through interconnect 440. The intersection of each row and column electrode forms an addressable pixel 400. For a more complete description of the display driver 37, see the above referred commenly assigned patent application entitled "Addressing Circuitry for Display Device".

The invention has been described in detail with particular reference to certain preferred embodiments thereof, but it will be understood that variations and modifications can be effected within the spirit and scope of the invention.

PARTS LIST

S subject
1 camera
3 imaging lens
20 area image sensor
32 logic and control unit
32*a* central processing unit
32*b* execution memory
32*c* program memory
32*d* mode control unit
34 electrical signal processor
35 temporary image memory
37 display driver
38 non-emissive display
110 pin
112 piercing point
114 conductive pads
116 pin matrix
200 field driven particles
210 fluid
220 microcapsules
230 matrix
240 row electrode
250 column electrode
400 addressable pixel
410 column driver
420 row driver

What is claimed is:

1. An electronic camera, comprising:
   a) means for focusing an image of a subject at an image plane;
   b) area image sensor means disposed at the image plane for receiving the image subject and producing a digital image having a plurality of pixels that represent the subject;
   c) storage means coupled to the area image sensor for storing the digitized image of the subject; and
   d) a non-emissive display for displaying an image corresponding to the stored image, including:
      i) field-driven solid phase particles disposed in a matrix that can change reflective density in the display in response to an applied electric field; and
      ii) electronic addressing means including electrodes which include a series of conductors that correspond to rows and columns and which intersect at positions corresponding to pixels, the electronic addressing means further includes means for addressing the conductors for applying voltages across the field-driven particles at particular locations corresponding to pixels in response to the stored image to produce a displayed image of the subject.

2. The electronic camera of claim 1 wherein the field-driven particles are effective in response to an applied field to migrate to an electrode in response to applied voltage.

3. The electronic camera of claim 1 further including a Central Processing Unit for controlling the storing and displaying of the image.

4. The non-emissive electronic display device of claim 1 wherein the field driven particles include bi-chromatic bi-polar particles.

5. The non-emissive electronic display device of claim 1 wherein the field driven particles include electrophoretic particles.

6. The non-emissive electronic display device of claim 1 wherein the field driven particles are contained in microencapsules.

7. The electronic camera of claim 2 wherein the field driven particles are erasable.

* * * * *